(12) United States Patent
Wittstadt et al.

(10) Patent No.: US 12,166,394 B2
(45) Date of Patent: Dec. 10, 2024

(54) INTERCONNECTION ASSEMBLY AND STATOR FOR AN ELECTRICAL MACHINE

(71) Applicant: ZF Friedrichshafen AG, Friedrichshafen (DE)

(72) Inventors: Ralf Wittstadt, Grettstadt (DE); Katja Willacker, Wiesentheid (DE); Jochen Wittmann, Burkardroth (DE); Sebastian Baumgart, Burkardroth (DE); Norbert Lohaus, Schweinfurt (DE); Tobias Schrenk, Bamberg (DE); Roland Lindwurm, Sennfeld (DE); Christoph Wieder, Küps (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 459 days.

(21) Appl. No.: 17/434,926

(22) PCT Filed: Mar. 3, 2020

(86) PCT No.: PCT/EP2020/055564
§ 371 (c)(1),
(2) Date: Aug. 30, 2021

(87) PCT Pub. No.: WO2020/178288
PCT Pub. Date: Sep. 10, 2020

(65) Prior Publication Data
US 2022/0149690 A1 May 12, 2022

(30) Foreign Application Priority Data
Mar. 5, 2019 (DE) .......................... 102019202911.6

(51) Int. Cl.
*H02K 3/50* (2006.01)
*H02K 3/28* (2006.01)

(52) U.S. Cl.
CPC ................. *H02K 3/50* (2013.01); *H02K 3/28* (2013.01); *H02K 2203/06* (2013.01); *H02K 2203/09* (2013.01)

(58) Field of Classification Search
CPC ... H02K 2203/09; H02K 2203/06; H02K 3/28
(Continued)

(56) References Cited

U.S. PATENT DOCUMENTS 10,069,261 B2 * 9/2018 Sakurada ............. H01R 43/048
2003/0094877 A1   5/2003 Hara et al.
(Continued)

FOREIGN PATENT DOCUMENTS

CN   203747537 U * 7/2014 ............... H02K 3/12
CN   203761166 U * 8/2014 ............... H02K 3/50
(Continued)

OTHER PUBLICATIONS

International Search Report and Written Opinion for PCT/EP2020/055564 mailed May 15, 2020 (10 pages; with English translation).

*Primary Examiner* — Forrest M Phillips
(74) *Attorney, Agent, or Firm* — Kristin L. Murphy (57) ABSTRACT

The present disclosure relates to an interconnection assembly for a stator of an electrical machine. The interconnection assembly comprises a shaped bus bar, which has a first region, which comprises a connection point of the interconnection assembly for an external connection, a second region, in which a connecting point for forming a connection of the bus bar to a stator winding is formed, and a central region, which connects the first region and the second region. The first region and the second region are arranged in parallel planes. The central region is oriented in such a way that an angle of a transition between the first region and the central region and an angle of a transition between the second region and the central region deviate from a right
(Continued)

angle. The disclosure also relates to a stator having an interconnection assembly.

20 Claims, 4 Drawing Sheets

(58) Field of Classification Search
USPC .......................................... 310/71
See application file for complete search history.

(56) References Cited

U.S. PATENT DOCUMENTS

| | | |
|---|---|---|
| 2005/0082923 A1 | 4/2005 | Akita et al. |
| 2009/0108688 A1 | 4/2009 | Miura |
| 2014/0306562 A1 | 10/2014 | Egami |
| 2018/0097416 A1 * | 4/2018 | Dang .................. H02K 3/50 |

FOREIGN PATENT DOCUMENTS

| | | | |
|---|---|---|---|
| DE | 10116831 A1 * | 10/2002 | ........... H02K 15/064 |
| DE | 102011077294 A1 | 12/2012 | |
| DE | 102013211968 A1 | 1/2015 | |
| EP | 3402052 A1 | 11/2018 | |
| KR | 101897540 B1 | 9/2018 | |
| WO | WO-2014065103 A1 * | 5/2014 | ............... H02K 3/12 |
| WO | WO-2022005197 A1 * | 1/2022 | |

* cited by examiner

INTERCONNECTION ASSEMBLY AND STATOR FOR AN ELECTRICAL MACHINE

CROSS-REFERENCE TO RELATED APPLICATIONS

This application is a national stage of International Application No. PCT/EP2020/055564, filed Mar. 3, 2020, the disclosure of which is incorporated herein by reference in its entirety, and which claimed priority to German Patent Application No. 102019202911.6, filed Mar. 5, 2019, the disclosure of which is incorporated herein by reference in its entirety.

TECHNICAL FIELD

The present disclosure relates to interconnection arrangements for a stator of an electric machine. Further aspects of the disclosure relate to stators for electric machines having inventive interconnection arrangements.

BACKGROUND

According to known concepts, stator coils or stator windings of an electric machine can be contacted by external connection points or power connections via an interconnection arrangement in order to apply a respective voltage to the individual phases of the winding via an electric circuit or power electronics.

Known interconnection arrangements have, for example, three connector rings, which are received inside a carrier. At the same time, the carrier can ensure the positioning of the rings and electrical insulation of the connector rings from one another. The connector rings are securely fixed in the carrier.

Connector rings have, for example, coil connection zones for connecting the interconnection arrangement to the stator winding and external connection zones for connecting the interconnection arrangement to external connections. The individual stator windings are each contacted by an external connection, for example by power cables of the power electronics, via the external connection zones.

US 2003 094 879 A1 discloses a centralized power distribution unit for a thin brushless motor of a vehicle, having a plurality of busbars, a resin insulation layer which covers the busbars and an insulating holder having a plurality of holding grooves which hold the busbars. The busbars are pre-bent in a thickness direction in order to form a substantially annular shape. Connection portions of the busbars protrude at a right angle from an embedded zone of the busbar.

US 2005 082 923 A1 discloses a stator of a rotating electric machine having a stator core, a plurality of coil pairs and a plurality of lines. The stator core comprises a laminated core assembly which is formed by laminating thin steel plates in a cylindrical form. The stator core has a plurality of slots at intervals along a circumferential direction.

However, in known concepts of interconnection arrangements, a high rigidity of elements of the interconnection arrangement can lead to mechanical stresses occurring at electrical contacting points in an installed state of the interconnection arrangement. This can impair a mechanical contact between two electrical conductors, for instance, and therefore also impair an electrical contact between the electrical conductors.

A flexible design of connecting elements, for example a continuation of wound, flexible wire windings of a coil, might prevent mechanical stresses in an installed state of the interconnection arrangement, but the assembly effort involved may be increased for such concepts. For such connections, the individual flexible conductors (for example wire or laminations) must each be precisely pre-positioned, which can be made more difficult by the easy deformability of a winding wire.

What is needed is an improved interconnection arrangement for a stator of an electric machine, which prevents mechanical stresses at respective contacting points in the installed state and/or can be assembled in a simple manner.

SUMMARY

An interconnection arrangement for a stator of an electric machine is proposed. The interconnection arrangement comprises at least one shaped busbar having a plurality of zones. A first zone of the busbar comprises a connection point of the interconnection arrangement for an external connection, for example for establishing contact between the interconnection arrangement and power electronics for controlling a stator winding of the stator. The busbar comprises a second zone, in which a connecting point for forming a connection between the busbar and a stator winding is formed. A middle zone of the busbar connects the first zone to the second zone.

At a first part of the busbar, the interconnection arrangement can therefore be contacted by supply electronics. At a second part of the busbar, which is formed, for example, at a connector ring segment formed by the busbar (e.g. in a common plane with the second zone of the busbar), the interconnection arrangement can be contacted by a winding of a stator. The connector ring segment can be received and fixed in a housing of the interconnection arrangement.

According to the disclosure, the middle zone is aligned such that a respective angle of a transition between the first zone and the middle zone and between the second zone and the middle zone deviates from a right angle. In other words, an angle of transition between mutually adjacent zones is not equal to 90°. In this case, the angle between zone sections which lie outside a bending radius of a bend of the shaped busbar between the zones can be measured.

By way of example, the angle of transition deviates from a right angle by more than a tolerance-related value. A right angle affected by tolerances can include, for example, 90°+/−1° (or +/−2°). According to the disclosure, however, the angle of transition is formed such that its deviation from a right angle is planned or intentional. The deviation can comprise, for example, more than 3° (or more than 5°, more than 10°, more than 20°, more than 30°, more than 40°; more than 50° or more than 60°) and/or less than 70° (or less than 60°, less than 50°, less than 40°, less than 30°, less than 20° or less than 15°). By way of example, the deviation comprises a value of 3° (or a value of 4°; a value of 5°, a value of 7°; a value of 10°, a value of 15°; a value of 20°, or a value of 25°).

As a result of the proposed selection of the angle of transition, a mild, in other words slight, elasticity of the middle zone can be produced. As a result of this, for example, the first zone can be displaced by a certain distance (e.g. up to 1 mm, up to 2 mm or up to 3 mm) with respect to the second zone, wherein a resultant mechanical load or deformation of the busbar principally occurs in the middle zone. In other words, the middle zone can provide a spring effect over a small displacement path.

A value of the angle of transition can be selected depending on a distance between the first and second zone. For example, a greater deviation of the angle from a right angle can be selected for a small distance than for a large distance in order to still realize sufficient elasticity of the middle zone. By way of example, the angle of transition can deviate from a right angle by at least 20° for a distance of less than 5 times a thickness of the busbar, it can deviate from a right angle by more than 8° and less than 20° for a distance of more than 5 times and less than 10 times a thickness of the busbar and/or it can deviate from a right angle by less than 8° for a distance of more than 10 times. Interconnection arrangements with various busbars can therefore always achieve a required length compensation during assembly of the interconnection arrangement.

For example, the first and the second zone are arranged in parallel planes. By way of example, the first zone lies in a plane which is inclined through less than 1° (or at least less than 2°, or less than 5°) with respect to a plane of the second zone. In the installed state of the interconnection arrangement in a stator, the planes can be aligned in the radial direction of the stator so that, for example, contacting of the interconnection arrangement by external connections can be carried out in a particularly simple manner. In this case, the second zone can be elongated or compressed in the axial direction in order to compensate tolerance gaps, for instance, between the first zone of the busbar and power connections.

By way of example, at least one sub-area of the middle zone is aligned in a connecting plane, wherein an angle between the connecting plane and the plane of the first zone deviates from a right angle. The range of values of the angle can be defined as described above. By way of example, the sub-area comprises at least 50% of an area of the middle zone. By way of example, a middle region (e.g. less than 50% of the area of the middle zone) of the middle zone can be arranged at a 90° angle with respect to the plane of the first or second zone, and the interconnection arrangement can still achieve a length compensation.

According to a development of the interconnection arrangement, the busbar has at least one curvature within the middle zone. In other words, the middle zone can be formed, for example, with one or more further kinks or bends. An elasticity of the middle zone can thus be influenced more precisely, for example. By way of example, curvatures can increase an elasticity of middle zones with low expansion. It is possible that the busbar is formed to be at least partly arcuate in the middle zone.

By way of example, a thickness of the busbar is less than 20 mm (or less than 10 mm, less than 5 mm, less than 4 mm, less than 3 mm or less than 2 mm) and/or more than 1 mm (or more than 3 mm or more than 5 mm). Alternatively or additionally, a ratio of a width of the busbar to a thickness of the busbar can have at least a factor of 2 (or at least a factor of 2.5; at least a factor of 3; at least a factor of 4; or at least a factor of 5). By way of example, a geometry of the busbar influences the elasticity of the busbar in the middle zone.

By way of example, the second zone of the busbar forms at least part of a connector ring or a connector ring segment for the stator. The second zone can extend circumferentially and adjoin the middle zone in a region radially outside the connector ring segment.

It is possible that the interconnection arrangement has a single busbar or two busbars. According to one exemplary arrangement, the interconnection arrangement has three busbars, formed to be electrically insulated form one another, for contacting three phases of a stator winding. By way of example, an interconnection arrangement for contacting a 4-phase or 5-phase winding can accordingly have 4 or 5 busbars.

The interconnection arrangement can have, for example, three busbars, formed to be electrically insulated from one another, for contacting three phases of the stator winding, wherein the respective middle zones of the busbars are arranged in different, non-parallel planes. As stated, manufacturing tolerances and the like can be compensated by the middle zones in that the middle zone is deformed accordingly in the axial and/or radial direction. Owing to the deformation, forces can therefore occur which act on the interconnection or the stator. To keep these forces low, in the case of a plurality of busbars, in one exemplary arrangement, the middle zones are therefore advantageously arranged in different planes, wherein in one exemplary arrangement, the planes do not extend parallel. Forces which may occur at the individual busbars are thus prevented from increasing, in particular in the radial direction; instead, they are kept low and possibly neutralize or lessen each other.

By way of example, in the case of interconnection arrangements having a plurality of busbars, at least two busbars are formed differently. By way of example, the middle zone of the first busbar has a curvature, whilst the middle zone of a second busbar is formed to be linear or planar. By way of example, the first zones of both busbars are formed in a common plane, whilst the second zone of the first busbar is arranged closer to the common plane than the second zone of the second busbar.

The busbar is formed, for example, from an electrically conductive material, in particular metal. The busbar can comprise, for example, copper, a copper alloy, aluminum or an aluminum alloy.

An aspect of the disclosure relates to a stator for an electric machine. The stator has an interconnection arrangement according to an interconnection arrangement described above or below for establishing contact between a winding of the stator (stator winding) and a connector device for supplying voltage to the stator winding. The disclosure furthermore relates to an electric machine having a stator comprising a corresponding interconnection arrangement, which is contacted by power connections, for example.

In this case, it is possible that a connection of the connecting points associated with the second zone of the busbar to windings of the stator winding is formed to be non-detachable (e.g. a weld connection). A connection of the power connections to the first zone of the busbar can be formed by a detachable connection (e.g. a screw or plug connection), for example.

According to a development of the stator, the first zone of the busbar of the interconnection arrangement is arranged in a normal plane of a main axis (e.g. a rotor axis) of the stator. In other words, a normal vector of the plane of the first zone lies parallel to the main axis. In this case, the elasticity of the middle zone of the busbar enables an axial displacement of the first zone of at least 1 mm, for example. By way of example, substantially only the middle zone is deformed upon a displacement of the first zone of up to 3 mm.

It is, for example, therefore possible to guide the first zone towards power connections of the electric machine in order to compensate assembly tolerances, for instance, without a mechanical stress (or with merely an insubstantial mechanical stress) occurring at contacting points between the interconnection arrangement and power connections and/or stator winding. The reliability of an electrical contact between the contacting points can therefore be increased, for example.

As a result of the disclosure, for example, an interconnection arrangement with length compensation is provided for an electric machine. The middle zone can achieve a slight change in length of the busbar for compensating tolerance-related gaps during the assembly of the interconnection arrangement.

Developments of the stator and the electric machine relate to features of developments as already described in connection with the interconnection arrangement. Repeated description is therefore omitted and the corresponding features also apply in connection with the stator and the electric machine as disclosed.

BRIEF DESCRIPTION OF THE DRAWINGS

Several examples of devices are explained in more detail below, merely by way of example, with reference to the accompanying figures, in which.

DETAILED DESCRIPTION

Figure 1:
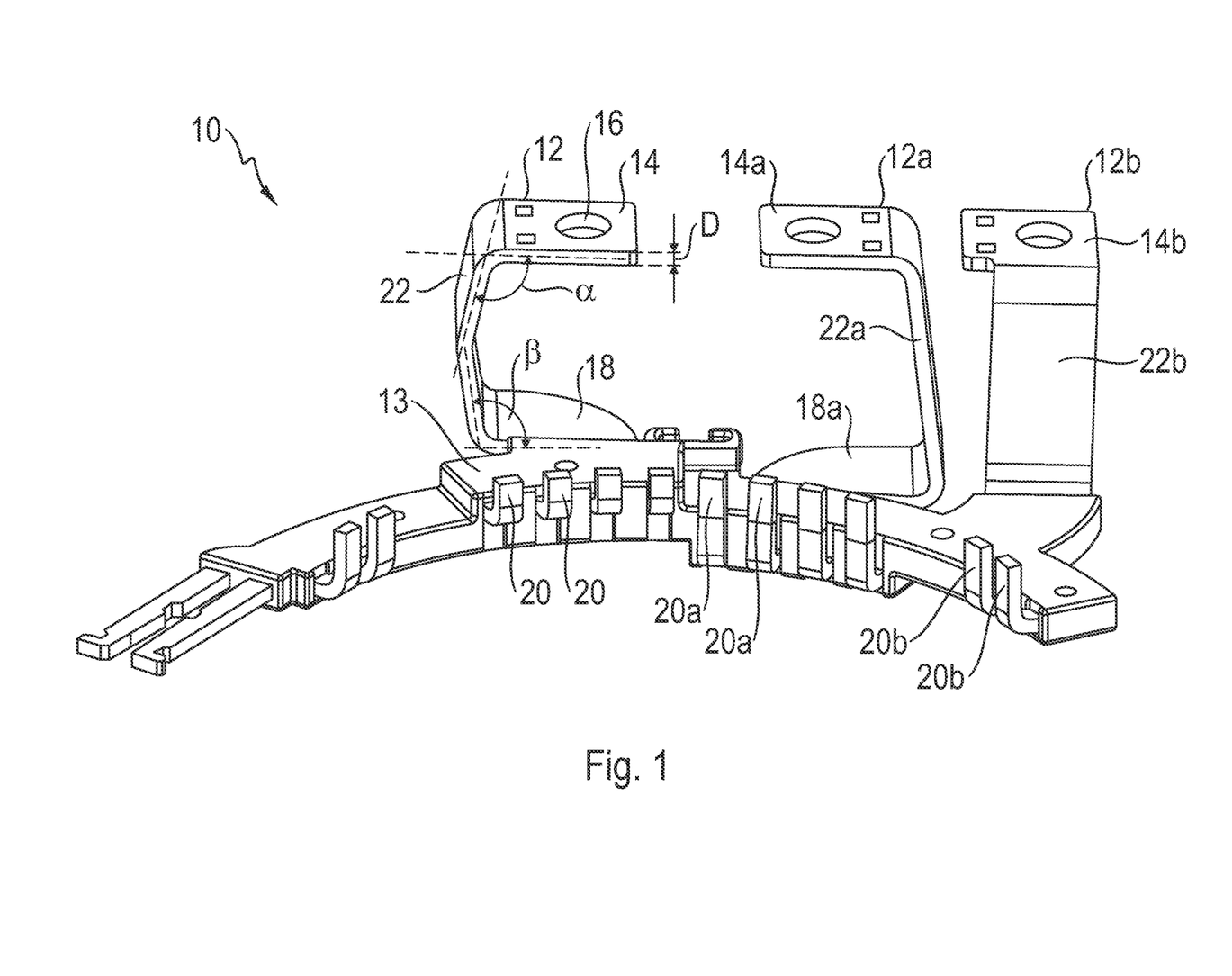
FIG. 1 shows an exemplary arrangement of an interconnection arrangement for contacting a stator winding.

FIG. 1 shows an exemplary arrangement of an interconnection arrangement 10 for establishing contact between a coil winding and power electronics of the coil winding. The circuit arrangement 10 has three busbars 12, 12a, 12b, which are each electrically insulated from one another and fixed in place by a holding mechanism or a housing 13 of the interconnection arrangement 10.

The busbar 12 has a first zone 14 having a connection point 16 for connecting the busbar 12 to an external connection. By way of example, the connection point 16 is formed to connect an external connection cable or a further busbar to the busbar 12 by a screw connection or plug connection. By way of example, the first zone 14 having the connection point 16 is formed as an external connection lug.

The busbar 12 furthermore has a second zone 18, at which connecting points 20 are formed for connecting the busbar 12 to a stator winding. The connecting points can be formed as planar, continuous surfaces for connecting a respective winding of the coil winding to a respective connecting point 20. The connection can be formed as a connection which is non-detachable (or only detachable through destruction), for example by a weld connection or solder connection. By way of example, in one exemplary arrangement, the connecting points 20 are coil connection lugs.

The busbar 12 furthermore has a middle zone 22, which connects the first zone 14 and the second zone 18 to one another. At a transition between the first zone 14 and the middle zone 22, i.e. at the bend of the busbar 12 between the two zones, an angle α is formed, which deviates from a right angle. By way of example, the angle α in the example shown in FIG. 1 has a value of 100° and therefore deviates from a right angle by 10°. An angle β of the transition between the second zone 18 and the middle zone 22 also has a value of 100° in the example shown in FIG. 1. In this case, the angles α and β can be selected to be identical or different. By way of example, one of the two angles can be an acute angle and the other a flat angle.

By way of example, in one exemplary arrangement, a thickness D of the busbar 12 has a value of 3 mm. In connection with the specific form of the angles α and β, a slight elasticity of the middle zone is, for example, produced thereby. The middle zone 22 can have a mild spring effect so as to achieve a small movement (for example of 1 mm or of 2 mm) of the first zone 14 in the direction of a normal vector of the first zone 14 into a plane parallel to the first zone 14 without a substantial mechanical stress (e.g. shear force or force in the direction of a normal vector of the parallel plane) in the first zone 14 and/or in the second zone 18. In this case, for example, the thickness D at the same time achieves sufficient rigidity of the busbar 12, so that the first zone 14, without the effect of a pressure or tensile force, remains positioned in a predetermined position and can therefore be easily contacted.

The interconnection arrangement 10 has, for example, three connector rings and a carrier, for example the housing 13. As also shown in FIG. 1, the connector rings can be designed as connector ring segments. A connector ring segment is formed, for example, by the second zone 18 of the busbar 12 within the housing 13.

The interconnection arrangement 10 shown in FIG. 1 is provided for a 3-phase stator winding. An electrical voltage can be applied to a respective phase in each case via the three busbars 12, 12a, 12b. In this case, the two further busbars 12, 12b also have respective first, second and middle zones, whereof the angles of transition each deviate from a 90° angle.

The carrier can be formed as a separate carrier part and can have a U-shaped profile with dividing walls, in which the connector rings are received such that they are insulated from one another. The carrier can be designed, for example, as a plastic overmold formed in a single piece with the connector rings.

The coil connection lugs are connected to the coils in a first plane. The external connection lugs are connected to the external connections in a second plane. Both planes are at an axial distance from one another. To bridge the axial distance, the external connection lugs (for example comprising the first, second and middle zone) are designed such that they are bent multiple times and have, for example, three zones in three planes.

One zone, for example the second zone 18, is arranged in predominantly the same plane as the coil connection lugs and forms a circumferential portion protruding in the radial direction (e.g. projecting from the connector ring segment). A further zone, for example the middle zone 22, is a portion of the external connection lug which, starting from the zone, is bent in the axial direction, for example, and then bent to form the final zone, for example the first zone 14. The planes of the zone and the final zone lie substantially parallel to one another, for example. The plane of the further zone intersects the planes of the two other zones at a predetermined angle.

An advantage can be achieved, for example, in that the predetermined angle, e.g. angle α, is not a 90° angle, but either more than or less than 90° (for example, at least 95° or at most 85°). A length compensation during assembly is realized, for example, by the inclined form of the further zone. When screw-connecting power connections to the external connection of the interconnection arrangement 10, the first zone, which serves as a connection zone, can be moved out of the plane associated therewith, for example, in the direction of the plane of the second zone, in order to achieve the length compensation. In this case, for example, only the second zone is deformed as a result of the already-present angular position.

In the case of other interconnections, on the other hand, when the middle zone is arranged perpendicularly to the other two, the entire interconnection could become deformed during the screwing procedure for establishing contact, whereby forces could also be introduced at weld points of the coils, which could lead, for example, to a split during operation.

Therefore, according to the inventive interconnection arrangement 10, a predetermined angular position of the middle zone is proposed so that a mild spring effect of the busbar is produced, for example.

Figure 2:
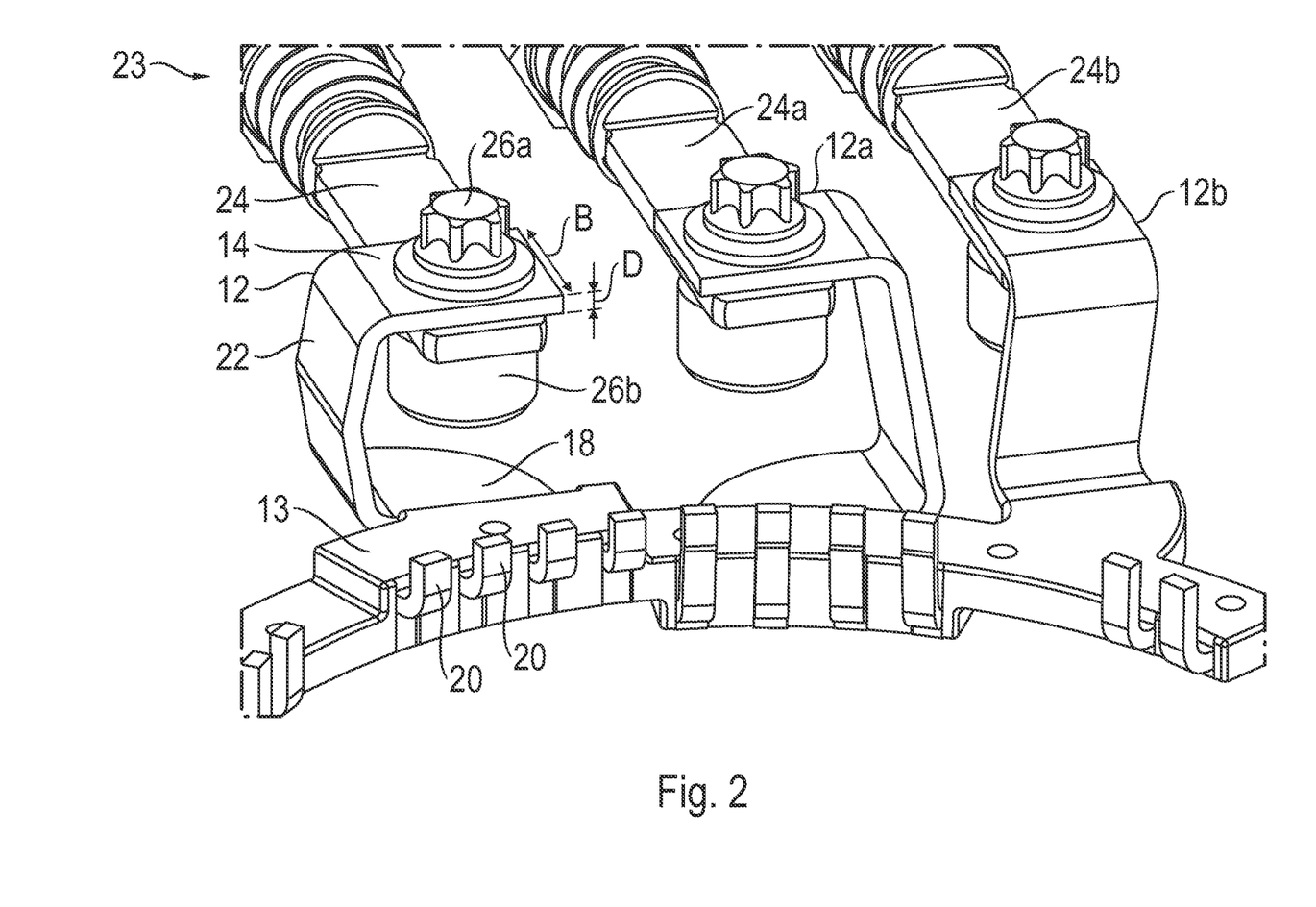
FIG. 2 shows an exemplary arrangement of an interconnection arrangement with assembled supply connections.

FIG. 2 shows an exemplary arrangement of an interconnection arrangement 10 with assembled supply connections 23. A supply connection 23 has a busbar 24, which forms an electrical contact with the first zone 14. In this case, a mechanical connection of the busbar 24 to the busbar 12 is produced by a 2-part fastening means 26a, 26b. The connection can be produced by a screw connection.

The further supply connections 23, which contact the further busbars 12a, 12b, have corresponding busbars 24a, 24b, which are assembled on the interconnection arrangement using corresponding fastening arrangements. In the present example, the connections of the power electronics, for example the supply connections 23, are inserted into the external connection lugs of the interconnection arrangement 10 from a side which is opposite, or faces, the connector rings.

A width B of the busbar 12 is furthermore shown in FIG. 2. In this case, a ratio of width B to thickness D of the busbar is more than a factor of 2. A screw connection of the busbar 12 to an external connection can thus be enabled, for example.

Figure 3:
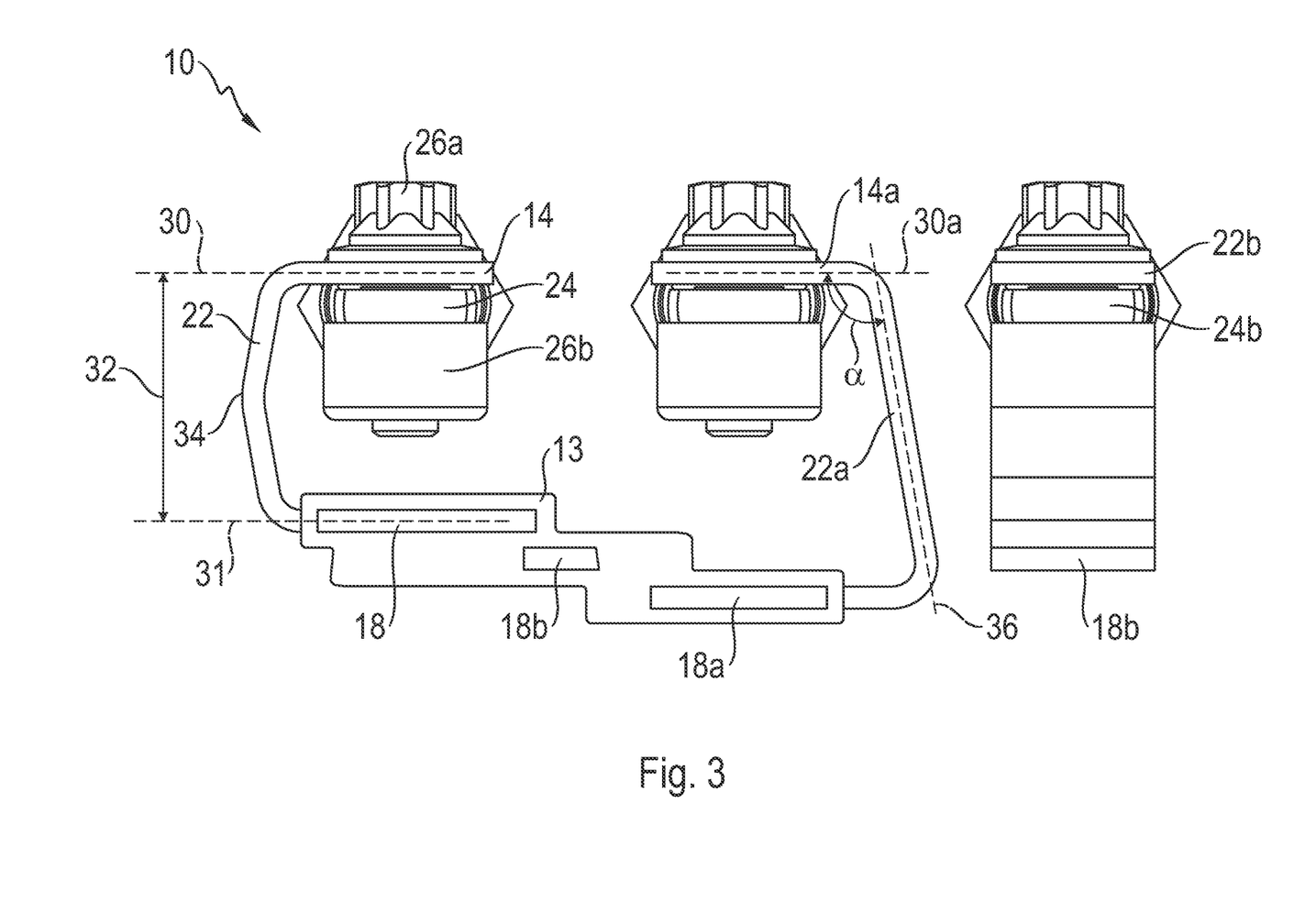
FIG. 3 shows the interconnection arrangement with supply connections in a sectional view.

FIG. 3 shows the interconnection arrangement 10 with assembled supply connections 23 in a sectional view. In this case, it can be seen that the first zone 14 and second zone 18 are aligned or arranged in parallel planes 30, 31. A distance 32, which is defined by an extent of the middle zone 22, is provided between the first zone 14 and the second zone 18. In a state in which the interconnection arrangement 10 is assembled on the stator, the distance 32 is an axial distance, for example.

Figure 4:
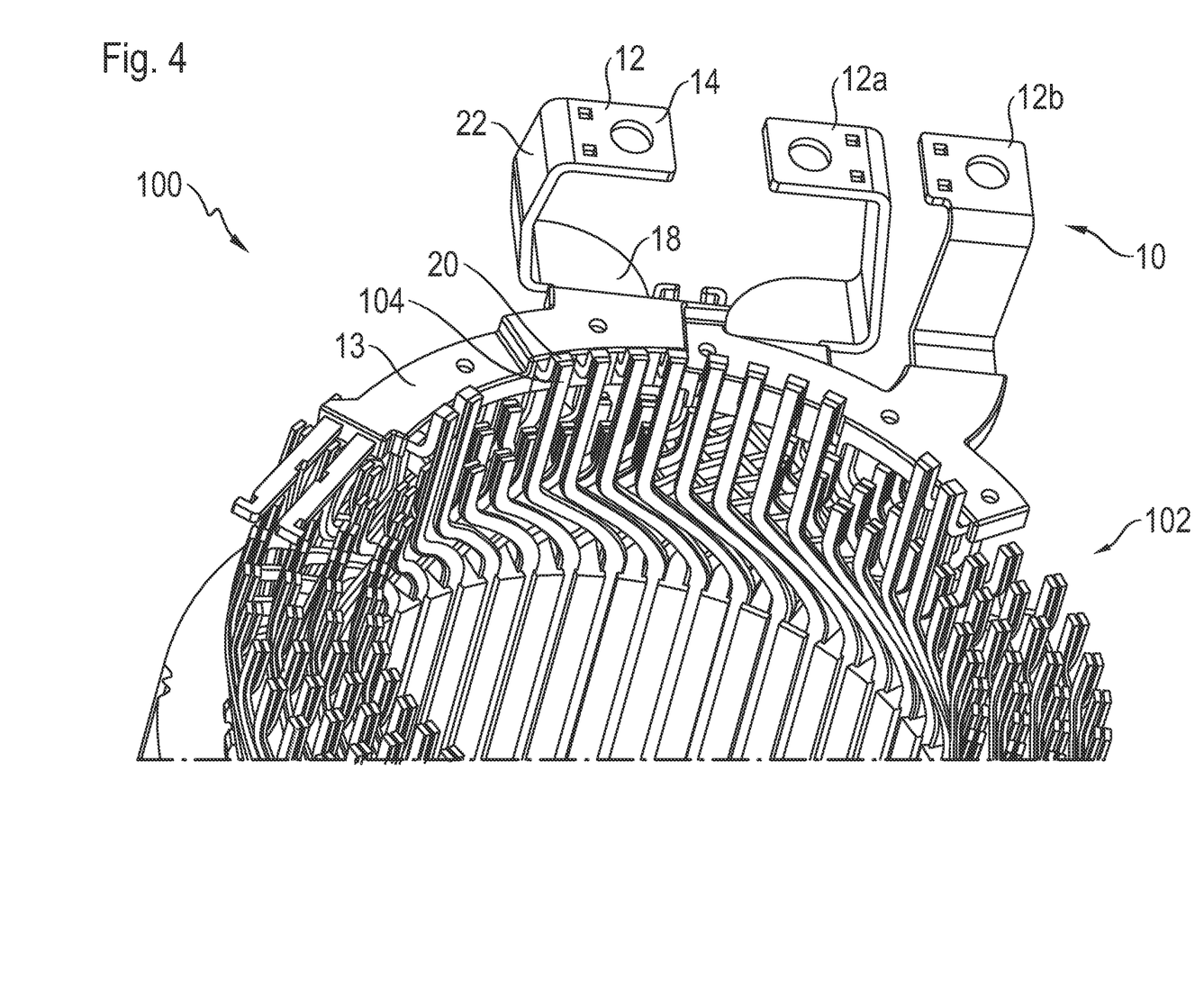
FIG. 4 shows an example of a stator of an electric machine with an interconnection arrangement.

It can furthermore be seen in FIG. 3 that the middle zone 22 of the busbar 12 has a curvature 34, for example a kink or a bend. By way of example, a flexibility of the middle zone 22 can be increased as a result of the curvature 34, so that only the middle zone 22 is deformed upon a change in the distance 32, yet mechanical stresses are not produced at connections between the first zone 14 of the busbar 12 and the busbar 24 of the supply connection, or the second zone 18 of the busbar 12 and assembled stator windings (c.f. FIG. 4). By way of example, the middle zone 22 can compensate an axial change in length via an elongation or compression of an extent of the middle zone in the radial direction.

It is furthermore shown in FIG. 3 that the further middle zone 22a is formed entirely in a connecting plane 36 which is arranged at the angle α with respect to a plane 30a of the further first zone 14a. An elasticity of the middle zone can also be achieved, for example, with a linear extent of the middle zone. The first zones 14, 14a, 14b are arranged in a common plane, whilst the second zones 18, 18a, 18b are each arranged in different planes in order to enable simple contacting of respective phases of a stator winding by the corresponding busbars 12, 12a, 12b of the interconnection arrangement, for example.

FIG. 4 shows a stator 100 of an electric machine (not illustrated) with a connector device 10. The stator 100 comprises a stator winding 102. Respective windings or winding ends 104 of the stator winding 102 are securely connected to connecting points 20 of the respective busbar 12, 12a, 12b.

In order to electrically contact a phase of the stator winding 102, a power connection can be screwed to the busbar 12. In this case, a tolerance-related axial distance between the first zone 14 and, for example, a busbar of the power connection can be compensated by the flexibility of the middle zone 22 of the busbar 12. By way of example, a distance between the first zone 14 and second zone 18 can be reduced through a compression of the middle zone 22 or increased through an elongation of the middle zone 22. The angle of transition between the zones and/or the thickness of the busbar 12 can be selected in such a way that a change in the distance between the first zone 14 and second zone 18 of more than 1 mm (or more than 2 mm) and/or less than 3 mm (or less than 2 mm), for example, is possible without mechanical stresses occurring at the connection points of the interconnection arrangement.

As a result the slight flexibility or elasticity of the middle zone 22, it is, for example, possible to compensate tolerance-related gaps when establishing contact between power electronics and the interconnection arrangement 10. In this case, however, the elasticity is selected to be sufficiently low such that the external connection points of the interconnection arrangement 10 are still able to remain in a predefined position and simple assembly of the power connections is enabled.

In some applications, the electric machine is installed in a housing, for example, such that the connection points of the electric machine or the interconnection arrangement for establishing contact with external connections of the power electronics cannot be displaced or aligned with respect to one another. In this case, for example, the external connections of the power electronics are also fixed in terms of their installation position. Therefore, an alignment of the two connection points, for instance, is not possible. In this case, for example, an axial distance of ca. 1 mm can arise between the connection points of the electric machine and the power electronics due to the tolerance chains.

The present disclosure proposes concepts according to which an interconnection arrangement is provided, which can compensate such assembly tolerances between an external connection of the stator or the interconnection arrangement and power connections. Therefore, for example, axial screw forces between the connection points of the electric machine and the power electronics do not have a negative effect on the contact points with the stator coils.

The invention claimed is:

1. An interconnection arrangement for a stator of an electric machine, the interconnection arrangement comprising at least one shaped busbar, the shaped busbar comprising: a first zone, which has a connection point of the interconnection arrangement for an external connection; a second zone, in which a connecting point for forming a connection of the busbar to a stator winding is formed; and a middle zone, which connects the first zone and the second zone, wherein the middle zone is aligned such that a respective angle of a transition between the first zone and the middle zone and between the second zone and the middle zone deviates from a right angle and wherein the second zone underlies the first zone such that a generally C-shape is defined.

2. The interconnection arrangement as claimed in claim 1, wherein the first zone and the second zone are arranged in parallel planes.

3. The interconnection arrangement as claimed in claim 1, wherein at least a sub-zone of the middle zone is aligned in a connecting plane, wherein an angle between the connecting plane and a plane of the first zone deviates from a right angle.

4. The interconnection arrangement as claimed in claim 1, wherein the busbar has at least one curvature within the middle zone.

5. The interconnection arrangement as claimed in claim 1, wherein the busbar is formed to be at least partly arcuate in the middle zone.

6. The interconnection arrangement as claimed in claim 1, wherein a thickness of the busbar is less than 5 mm.

7. The interconnection arrangement as claimed in claim 1, wherein a ratio of a width of the busbar to a thickness of the busbar has at least a factor of 2.

8. An interconnection arrangement for a stator of an electric machine, comprising:
a holding mechanism; and
three busbars, formed to be electrically inaulated from one another for contacting three phases of a stator winding, wherein at least one of the busbars is shaped, the shaped busbar comprising:
a first zone, which has a connection point of the interconnection arrangement for an external connection, wherein the first zone is axially spaced from the holding mechanism;
a second zone, in which a connecting point for forming a connection of the busbar to a stator winding is formed, the second zone extending radially outward from the holding mechanism and axially spaced from the first zone; and
a middle zone, which connects the first zone and the second zone,
wherein the middle zone is aligned such that a respective angle of a transition between the first zone and the middle zone and between the second zone and the middle zone deviates from a right angle;
wherein the respective middle zones of the busbars are arranged in different non-parallel planes.

9. The interconnection arrangement as claimed in claim 1 wherein the interconnection arrangement has three busbars, formed to be electrically insulated from one another, for contacting three phases of the stator winding, wherein respective first zones of the busbars are arranged in a common plane.

10. A Stator for an electric machine, wherein the stator has an interconnection arrangement, as claimed in claim 1, for establishing contact between a stator winding and an electrical connector device for supplying a voltage to the stator winding.

11. The stator as claimed in claim 10, wherein a first zone of the busbar of the interconnection arrangement is arranged in a normal plane of a main axis of the stator, wherein an elasticity of the middle zone of the busbar enables an axial displacement of the first zone of at least 1 mm.

12. The interconnection arrangement of claim 1, wherein the connection point is normal to the first zone and is formed as an aperture.

13. The interconnection arrangement of claim 8, wherein a middle zone of one of the busbars is formed entirely in a connecting plane that is arranged at an angle with respect to a plan of a first zone of the one of the busbar.

14. The interconnection arrangement of claim 9, wherein respective second zones of the busbars are each arranged in different planes.

15. The interconnection arrangement of claim 8, wherein the three busbars are fixed in place with respect to one another by a housing element.

16. An interconnection arrangement for a stator of an electric machine, the interconnection arrangement comprising:
at least a first and second shaped busbar,
wherein the first shaped busbar includes a first busbar first zone, which has a first busbar connection point of the interconnection arrangement for an external connection; a first busbar second zone, in which a first busbar connecting point for forming a first busbar connection of the first busbar to a stator winding is formed; and a first busbar middle zone, which connects the first busbar first zone and the first busbar second zone, wherein the first busbar middle zone is aligned such that a respective first angle of a transition between the first busbar first zone and the first busbar middle zone and between the first busbar second zone and the first busbar middle zone deviates from a right angle and wherein the second zone underlies the first zone such that a generally C-shape is defined; and
wherein the second shaped busbar includes a second busbar first zone, which has a second busbar connection point of the interconnection arrangement for an external connection; a second busbar second zone in which a second busbar connecting point for forming a second busbar connection of the second busbar to the stator winding is formed; and a second busbar middle zone, which connects the second busbar first zone and the second busbar second zone, wherein the second busbar middle zone is aligned such that a respective first angle of transition between the second busbar first zone and the second busbar middle zone and between the second busbar second zone and the second busbar middle zone deviates from a right angle; wherein the second busbar second zone is arranged in a different plane than the first busbar second zone.

17. The interconnection arrangement of claim 16, wherein the second busbar middle zone is formed entirely in a connecting plane that is arranged at an angle with respect to a plane of the second busbar first zone.

18. The interconnection arrangement of claim 16, wherein the first busbar first zone and the first busbar second zone are arranged in parallel planes and wherein the second busbar first zone and the second busbar second zone are arranged in parallel planes.

19. The interconnection arrangement of claim 16, wherein the first busbar is formed to be at least partly arcuate in the first busbar middle zone.

20. The interconnection arrangement of claim 16, wherein a thickness of the each of the first busbar and the second busbar is less than 5 mm.

* * * * *